US009098573B2

(12) United States Patent
Spielthenner

(10) Patent No.: US 9,098,573 B2
(45) Date of Patent: Aug. 4, 2015

(54) SYSTEM, METHOD AND COMPUTER PROGRAM FOR PREPARING DATA FOR ANALYSIS

(75) Inventor: Doris Spielthenner, St. Kilda (AU)

(73) Assignee: Patent Analytics Holding Pty Ltd, St. Kilda, Victoria (AU)

( * ) Notice: Subject to any disclaimer, the term of this patent is extended or adjusted under 35 U.S.C. 154(b) by 0 days.

(21) Appl. No.: 13/179,439

(22) Filed: Jul. 8, 2011

(65) Prior Publication Data

US 2012/0011132 A1    Jan. 12, 2012

Related U.S. Application Data

(60) Provisional application No. 61/362,520, filed on Jul. 8, 2010.

(30) Foreign Application Priority Data

Jul. 8, 2010    (AU) .................................. 2010202901

(51) Int. Cl.
*G06F 17/30*    (2006.01)

(52) U.S. Cl.
CPC ................................ *G06F 17/30728* (2013.01)

(58) Field of Classification Search
CPC .................... G06F 17/30864; G06F 17/30728
USPC ........................................ 707/750, 748, 937
See application file for complete search history.

(56) References Cited

U.S. PATENT DOCUMENTS

| | | | |
|---|---|---|---|
| 5,519,608 A | 5/1996 | Kupiec | |
| 5,721,910 A | 2/1998 | Unger et al. | |
| 5,832,476 A | 11/1998 | Tada et al. | |
| 5,991,751 A * | 11/1999 | Rivette et al. | .......................... 1/1 |
| 6,038,574 A | 3/2000 | Pitkow et al. | |
| 6,112,202 A | 8/2000 | Kleinberg | |
| 6,182,091 B1 | 1/2001 | Pitkow et al. | |
| 6,272,507 B1 * | 8/2001 | Pirolli et al. | ................... 715/206 |
| 6,285,999 B1 | 9/2001 | Page | |
| 6,339,767 B1 | 1/2002 | Rivette et al. | |
| 6,389,418 B1 | 5/2002 | Boyack et al. | |
| 6,457,028 B1 | 9/2002 | Pitkow et al. | |
| 6,499,026 B1 | 12/2002 | Rivette et al. | |
| 6,604,114 B1 | 8/2003 | Toong et al. | |
| 6,725,259 B1 | 4/2004 | Bharat | |
| 6,754,873 B1 | 6/2004 | Law et al. | |
| 6,763,354 B2 * | 7/2004 | Hosken | ................................ 1/1 |
| 7,194,691 B1 | 3/2007 | Zilka et al. | |
| 7,251,643 B2 | 7/2007 | Gange et al. | |

(Continued)

OTHER PUBLICATIONS

Kessler, M. M., "Bibliographic Coupling Between Scientific Papers," American Documentation, Jan. 1963, pp. 10-25, vol. 14, Issue 1, American Documentation Institute, Washington, D.C.

(Continued)

*Primary Examiner* — Miranda Le
(74) *Attorney, Agent, or Firm* — Alston & Bird LLP

(57) ABSTRACT

A method of preparing data for analysis, comprising the steps of receiving an initial data set including a plurality of records, each of the plurality of records including an identifier attribute and an associative attribute that identifies a further one or more records;

receiving the further one or more records identified by the associative attribute in each of the plurality of records; and associating the further one or more records with the initial data set to form a final data set.

6 Claims, 11 Drawing Sheets

(56) References Cited

U.S. PATENT DOCUMENTS

| | | | |
|---|---|---|---|
| 7,269,587 B1* | 9/2007 | Page | 1/1 |
| 7,433,884 B2* | 10/2008 | Breitzman | 1/1 |
| 7,454,428 B2 | 11/2008 | Wang et al. | |
| 7,493,320 B2 | 2/2009 | Canright et al. | |
| 7,610,367 B2 | 10/2009 | Canright et al. | |
| 7,634,716 B1* | 12/2009 | Law et al. | 715/205 |
| 7,668,822 B2 | 2/2010 | Kaul et al. | |
| 7,672,950 B2 | 3/2010 | Eckardt, III et al. | |
| 7,716,225 B1* | 5/2010 | Dean et al. | 707/748 |
| 7,716,226 B2 | 5/2010 | Barney | |
| 7,768,942 B2 | 8/2010 | Young et al. | |
| 7,797,336 B2* | 9/2010 | Blair et al. | 707/773 |
| 7,797,344 B2 | 9/2010 | Kaul et al. | |
| 7,844,566 B2* | 11/2010 | Wnek | 706/55 |
| 7,949,728 B2 | 5/2011 | Rivette et al. | |
| 8,131,701 B2* | 3/2012 | Barney | 707/705 |
| 8,271,266 B2* | 9/2012 | Gallagher et al. | 704/10 |
| 8,312,049 B2* | 11/2012 | Chayes et al. | 707/793 |
| 8,402,026 B2* | 3/2013 | Gallivan | 707/737 |
| 2003/0030637 A1* | 2/2003 | Grinstein et al. | 345/420 |
| 2003/0046307 A1 | 3/2003 | Rivette et al. | |
| 2003/0172020 A1 | 9/2003 | Davies et al. | |
| 2003/0228890 A1 | 12/2003 | Falaki | |
| 2004/0068697 A1* | 4/2004 | Harik et al. | 715/513 |
| 2004/0083117 A1* | 4/2004 | Kim et al. | 705/1 |
| 2004/0122841 A1 | 6/2004 | Goodman et al. | |
| 2004/0123245 A1* | 6/2004 | Bianchi et al. | 715/526 |
| 2004/0133433 A1* | 7/2004 | Lee et al. | 705/1 |
| 2004/0230577 A1* | 11/2004 | Kawatani | 707/6 |
| 2005/0010559 A1* | 1/2005 | Du et al. | 707/3 |
| 2005/0033742 A1* | 2/2005 | Kamvar et al. | 707/7 |
| 2005/0060287 A1 | 3/2005 | Hellman et al. | |
| 2005/0060303 A1 | 3/2005 | Wu et al. | |
| 2005/0086260 A1* | 4/2005 | Canright et al. | 707/104.1 |
| 2005/0097093 A1 | 5/2005 | Clarkson | |
| 2005/0154690 A1 | 7/2005 | Nitta et al. | |
| 2005/0165766 A1 | 7/2005 | Szabo | |
| 2005/0182755 A1 | 8/2005 | Tran | |
| 2005/0210009 A1* | 9/2005 | Tran | 707/3 |
| 2006/0069679 A1* | 3/2006 | Percey et al. | 707/6 |
| 2006/0101048 A1 | 5/2006 | Mazzagatti et al. | |
| 2006/0225000 A1 | 10/2006 | Albrecht et al. | |
| 2007/0073625 A1* | 3/2007 | Shelton | 705/59 |
| 2007/0208772 A1 | 9/2007 | Harik et al. | |
| 2008/0068401 A1 | 3/2008 | Albrecht et al. | |
| 2008/0134060 A1 | 6/2008 | Albrecht et al. | |
| 2009/0070297 A1 | 3/2009 | Hadzima, Jr. et al. | |
| 2009/0070301 A1* | 3/2009 | McLean et al. | 707/3 |
| 2009/0089248 A1 | 4/2009 | Alexander et al. | |
| 2009/0164404 A1 | 6/2009 | Sampath et al. | |
| 2010/0030734 A1 | 2/2010 | Chunilal | |
| 2010/0077007 A1 | 3/2010 | White et al. | |
| 2010/0094910 A1 | 4/2010 | Bayliss | |
| 2010/0106752 A1* | 4/2010 | Eckardt et al. | 707/805 |
| 2010/0114862 A1 | 5/2010 | Young et al. | |
| 2010/0174698 A1* | 7/2010 | Odland et al. | 707/706 |
| 2010/0180223 A1 | 7/2010 | Speier | |
| 2010/0205541 A1 | 8/2010 | Rapaport et al. | |
| 2010/0241580 A1 | 9/2010 | Schleier-Smith | |
| 2010/0287478 A1 | 11/2010 | Avasarala et al. | |
| 2010/0325082 A1 | 12/2010 | Helms, II et al. | |
| 2011/0072024 A1 | 3/2011 | Barney | |
| 2011/0179037 A1 | 7/2011 | Mizuguchi et al. | |
| 2011/0191277 A1 | 8/2011 | Agúndez Dominguez et al. | |
| 2011/0274106 A1* | 11/2011 | Suginaka et al. | 370/389 |
| 2012/0011132 A1 | 1/2012 | Spielthenner | |
| 2012/0023145 A1 | 1/2012 | Brannon et al. | |

OTHER PUBLICATIONS

Kessler, M. M., "An Experimental Study of Bibliographic Coupling Between Technical Papers," IEEE Transactions on Informational Theory, Jan. 1963, pp. 49-51, IEEE, New York.

Bichteler, Julie, et al., "The Combined Use of Bibliographic Coupling and Cocitation for Document Retrieval," Journal of the American Society for Information Science, Jul. 1980, pp. 278-282, vol. 31, Issue 4, John Wiley & Sons, Inc., Hoboken.

Cawkell, A. E., "Correspondence: Science Citation Index," Nature, Nov. 21, 1970, pp. 789-790, vol. 228, Nature Publishing Group, U.K.

Small, Henry, et al., "The Structure of Scientific Literatures, I: Identifying and Graphing Specialties," Science Studies, Jan. 1974, pp. 17-40, vol. 4, Issue 1, Sage Publications, Ltd., U.K.

Griffith, Belver C., et al., "The Structure of Scientific Literatures, II: Toward a Macro- and Microstructure for Science," Science Studies, Jan. 1974, pp. 339-365, vol. 4, Issue 1, Sage Publications, Ltd., U.K.

Price, Nancy, et al., "A Clustering Experiment: First Step Towards a Computer-Generated Classification Scheme," Inf. Stor. Retr., Aug. 1968, vol. 4, No. 3, pp. 271-280, Pergamon Press, Great Britain.

Garfield, Eugene, "Announcing the SCI Compact Disc Edition: CD-ROM Gigabyte Storage Technology, Novel Software, and Bibliographic Coupling Make Desktop Research and Discovery a Reality," Essays of an Information Scientist: Science Literacy, Policy, Evaluation, and Other Essays, May 30, 1988, pp. 160-170, vol. 11, Current Contents, No. 22, pp. 3-13, USA.

Small, Henry G., et al., "Journal Clustering Using a Bibliographic Coupling Method," Information Processing & Management, Apr. 1977, pp. 277-288, vol. 13, Pergamon Press, Great Britain.

Sharabchiev, J. T., "Cluster Analysis of Bibliographic References As a Scientometric Method," Scientometrics, 1989, pp. 127-137, vol. 15, Nos. 1-2, Published Jointly by Elsevier, Oxford, and Akadëmiai Kiadó, Budapest.

Kochtanek, Thomas R., "Bibliographic Compilation Using Reference and Citation Links," Information Processing & Management, 1982, pp. 33-39, vol. 18, No. 1, Pergamon Press Ltd, Great Britian.

Jahiel, Rene I., et al., "Targeted Citation Studies: An Alternative to Co-Citation Analysis for the Mapping of Scientific Fields," Proceedings of the 44th ASIS Annual Meeting, Oct. 1981, pp. 288-290, vol. 18, Knowledge Industry Publications, Inc., White Plains.

Vladutz, G., et al., "Bibliographic Coupling and Subject Relatedness," Proceedings of the 47th ASIS Annual Meeting, Oct. 1984, pp. 204-207, vol. 21, Knowledge Industry Publications, Inc., White Plains.

Konski, Antoinette F., et al., "Stem Cell Patents: A Landscape Analysis," Nature Biotechnology, Aug. 2009, pp. 722-726, vol. 27, No. 8, Nature Publishing Group, U.K.

Strandburg, Katherine J., et al., "Law and the Science of Networks: An Overview and an Application to the 'Patent Explosion'," Berkeley Technology Law Journal, Fall 2006, pp. 1293-1362, vol. 21, No. 4, Berkeley Technology Law Journal, Berkeley.

Érdi, Péter, et al., "Prediction of Emerging Technologies Based on Analysis of the U.S. Patent Citation Network," Scientometrics, Jun. 2012, pp. 1-21, Akadémiai Kiadóco-published with Springer Science+Business Media B.V., Formerly Kluwer Academic Publishers B.V., Budapest.

United States Patent and Trademark Office, Office Action for U.S. Appl. No. 13/179,437, dated Oct. 11, 2012, 28 pages, USA.

United States Patent and Trademark Office, Office Action for U.S. Appl. No. 13/179,437, dated Apr. 9, 2013, 41 pages, USA.

* cited by examiner

SYSTEM, METHOD AND COMPUTER PROGRAM FOR PREPARING DATA FOR ANALYSIS

CROSS REFERENCE TO RELATED APPLICATIONS

This nonprovisional application claims priority to U.S. Provisional Application No. 61/362,520, filed Jul. 8, 2010, and Australian Application No. 2010202901, filed Jul. 8, 2010, all of which are hereby incorporated by reference in their entirety.

FIELD OF THE INVENTION

The present invention relates to a system, method and computer program for collating and preparing data for subsequent use in a data analysis process. Embodiments of the invention find particular, but not exclusive use in the collation and preparation of patent data. Other embodiments of the invention may find use in the collation and preparation of data in relation to trade marks, scientific publications, and court judgments.

BACKGROUND OF THE INVENTION

With the advent of cheap and powerful computing systems and the development of the electronic database, there has been an explosion in the collection and electronic storage of data related to almost all areas of technology, industry, commerce and society. Data is generally held, in many instance, in the form of a "record", which typically comprises a series of attributes that describe a real world object or event. For example, one type of data record is a health record, which holds information regarding the attributes of a given person, such as their height, gender, weight, existing and past medical conditions, etc. Another type of data record is a database of scientific publications, the database including attributes regarding the publications such as the authors of each publication, citations or references to other publications, and the subject matter of each publication.

Another structured set of data is data describing intellectual property rights, such as patent data records or trade mark data records. Many countries have legal regimes where owners or creators of intellectual property can register their rights to an invention, a sign and/or a design. Such records are highly structured and include a large number of attributes, such as a date of filing, the name of the Owner or Applicant, the names of the Inventors, data regrading the history of the invention and particular intellectual property office classification codes, such as the IPC (International Patent Classification) code, plus other attributes that describe the nature of the intellectual property right.

As patent data is effectively a record of innovative activity, value can be derived from searching patent data to extract commercially useful information.

However, as an ever growing number of patents are filed every year, due to a constant increase in the rate of technological development and a greater awareness of the legal rights covering inventions, patent databases now contain millions or tens of millions of records, and in turn each record contains a large and complex set of attributes. Therefore, traditional methods for searching such databases (such as by looking for keywords in the Title, Abstract or Applicant Details) lack precision, are prone to error and can return large and unwieldy data sets.

More importantly, without seeking professional assistance and studying each patent specification in detail, it is difficult to judge the relative worth or "merit" of a particular patent, or the underlying invention protected by the patent, in comparison to other patents and patented inventions. As such, traditional search methodologies struggle to adequately provide any sophisticated or high level information regarding the relative merit or worth of a patent.

SUMMARY OF THE INVENTION

In a first aspect, the present invention provides a method of preparing data for analysis, comprising the steps of:

receiving an initial data set including a plurality of records, each of the plurality of records including an identifier attribute and an associative attribute that identifies a further one or more records;

receiving the further one or more records identified by the associative attribute in each of the plurality of records; and associating the further one or more records with the initial data set to form a final data set.

In an embodiment, the method comprises the further step of upon receiving the initial data set, reviewing the associative attribute;

comparing each associative attribute from each of the plurality of data records to the identifier attribute in each of the plurality of records; and only receiving the further one or more records identified by the associative attribute if the associative attribute does not match any one of the identifier attributes in the initial data set.

The step of receiving an initial data set may be preceded by the step of inputting a search query arranged to extract the initial data set from a database of data records.

The plurality of records may include information regarding patents, and if so, the identifier attribute may be one of a patent serial number or a patent application number. Also, the associative attribute may be a list of citations, including at least one of forward citations and backward citations.

The plurality of records may also represent information regarding trade marks, with the attributes comprising citations by trade marks examiners to earlier published trade marks that are similar to the trade mark application being examined, and in a similar class of goods and services.

The plurality of records may also represent information regarding scientific publications, with the attributes comprising citations by the authors to earlier scientific publications.

The method steps may be iterated one or more times.

In one embodiment, each of the data records received may be reviewed to determine whether the data record is in a format suitable for analysis, and if not, the data record may be reformatted or removed.

In a second aspect, the present invention provides a method of preparing data for analysis, comprising the steps of:

receiving a data set including a plurality of data records, each data record including an identifier attribute and an associative attribute; and linking each of the plurality of data records that share at least one common identifier attribute value, to form one or more networks of data records.

The method may comprise the further step of reviewing the network of data records to identify data records that are not linked to any other data record, and removing the non-linked data records from the data set.

For each network of data records, the number of data records in each of the one or more networks may be counted to ascribe a size value to each of the one or more networks.

In an embodiment, the method may comprise the further step of selecting only the network with the largest size value.

In another embodiment, the method may comprise the further step of:
setting a predetermined size value;
comparing the predetermined size value to the size value for each of the one or more networks; and
selecting only the one or more networks that have a size value greater than the predetermined size value.

In yet another embodiment, the method may comprise the further step of:
setting a predetermined ratio value as a function of the largest size value;
determining a ratio value for each of the one or more networks as a function of the predetermined ratio; and
selecting only the one or more networks that are less than the predetermined ratio.

A subject matter value may be selected for each of the one or more networks, and only the one or more networks that have a subject matter value that is substantially similar to one or more predetermined subject matter values may be selected.

Selecting the subject matter value may include the further step of identifying one or more subject matter attributes for each of the records in each of the one or more networks and utilising the one or more subject matter attributes to derive a subject matter value.

The step of utilising the one or more subject attributes may include the further step of providing at least one of the one or more subject matter attributes to a user for review and receiving user input regarding the subject matter value. The subject matter value may be utilised to rank the records.

One of the subject matter attributes may be a computed network value using the association through direct and indirect forward citations and the step of ranking includes ranking the data records from highest network value to the least network value.

One of the subject matter attributes may be the number of family members, wherein the step of ranking includes ranking the data records from most family members to least family members.

One of the subject matter attributes may be an International Patent Classification (IPC) code, wherein the step of ranking includes ranking the data records from most popular IPC to least popular IPC.

One of the subject matter attributes may be the number of times one or more keywords appears in the subject matter attribute, wherein the step of ranking includes ranking the data records from most number of times one or more keywords appear in the subject matter attribute to least number of times the keywords appear in the subject matter attribute.

The one or more selected networks may be displayed utilising a visualisation methodology.

In a third aspect, the invention provides a method for preparing data for analysis, comprising the steps of, receiving a data set in accordance with the first or the second aspect, and reducing the number of data records in each of the one or more networks.

The step of reducing the number of data records may include the further step of identifying at least one pair of data records that are linked by a common attribute value, and identifying further data records that are linked to both of the at least one pair of data records by the common attribute value, to derive a count of the total number of links between the pair of data records.

The method steps of the third aspect may be iterated, to derive a count of the total links between all of the pairs of data records in the data set.

A predetermined level of links may be set between a pair of data records and removing all pairs of data records that have a number of links below the predetermined level.

The step of reducing the number of data records may include the further step of identifying each link between a pair of data records, counting the number of degrees of separation for each link to derive a separation value representative of the number of instances of each of the number of degrees of separation for the pair of data records, assigning a multiplier to each of the degrees of separation, multiplying each multiplier with each respective separation value to derive a count value for each degree of separation and removing all pairs of records with a count value below a predetermined value.

In an embodiment, the method may include the further step of removing any data records that are not connected to any of the other data records.

In a fourth aspect, the present invention provides a system for preparing data for analysis, comprising:
a receiving module arranged to receive an initial data set including a plurality of records, each of the plurality of records including an identifier attribute and an associative attribute that identifies a further one or more records;
the receiving module being further arranged to receive the further one or more records identified by the associative attribute in each of the plurality of records; and
an association module arranged to associate the further one or more records with the initial data set to form a final data set.

In a fifth aspect, the present invention provides a system of preparing data for analysis, comprising:
a receiving module arranged to receive a data set including a plurality of data records, each data record including an identifier attribute and an associative attribute; and
an associative module arranged to link each of the plurality of data records that share at least one common identifier attribute value, to form one or more networks of data records.

In a sixth aspect, the present invention provides a system for preparing data for analysis, comprising a receiving module arranged to receive a data set in accordance with the first aspect of the invention and a reduction module arranged to reduce the number of data records in each of the one or more networks.

In a seventh aspect, the present invention provides a computer program, including at least one instruction, which, when executed on a computing system, is arranged to implement a method in accordance with one or more of the first, second and third aspects of the invention.

In an eighth aspect, the present invention provides a computer readable media including a computer program in accordance with the seventh aspect of the invention.

In an ninth aspect, the present invention provides a method of transmitting or receiving a computer data signal comprising at least one encoded instruction in accordance with the computer program of the seventh aspect of the invention.

DETAILED DESCRIPTION OF THE DRAWINGS

Notwithstanding any other embodiments that may fall within the scope of the present invention, an embodiment of the present invention will now be described, by way of example only, with reference to the accompanying figures, in which.

DETAILED DESCRIPTION OF AN EMBODIMENT

The foregoing description describes only a preferred embodiment of the broader invention and modifications, obvious to those skilled in the art, can be made without departing from the scope of the broader invention described in the specification as a whole.

Figure 1:
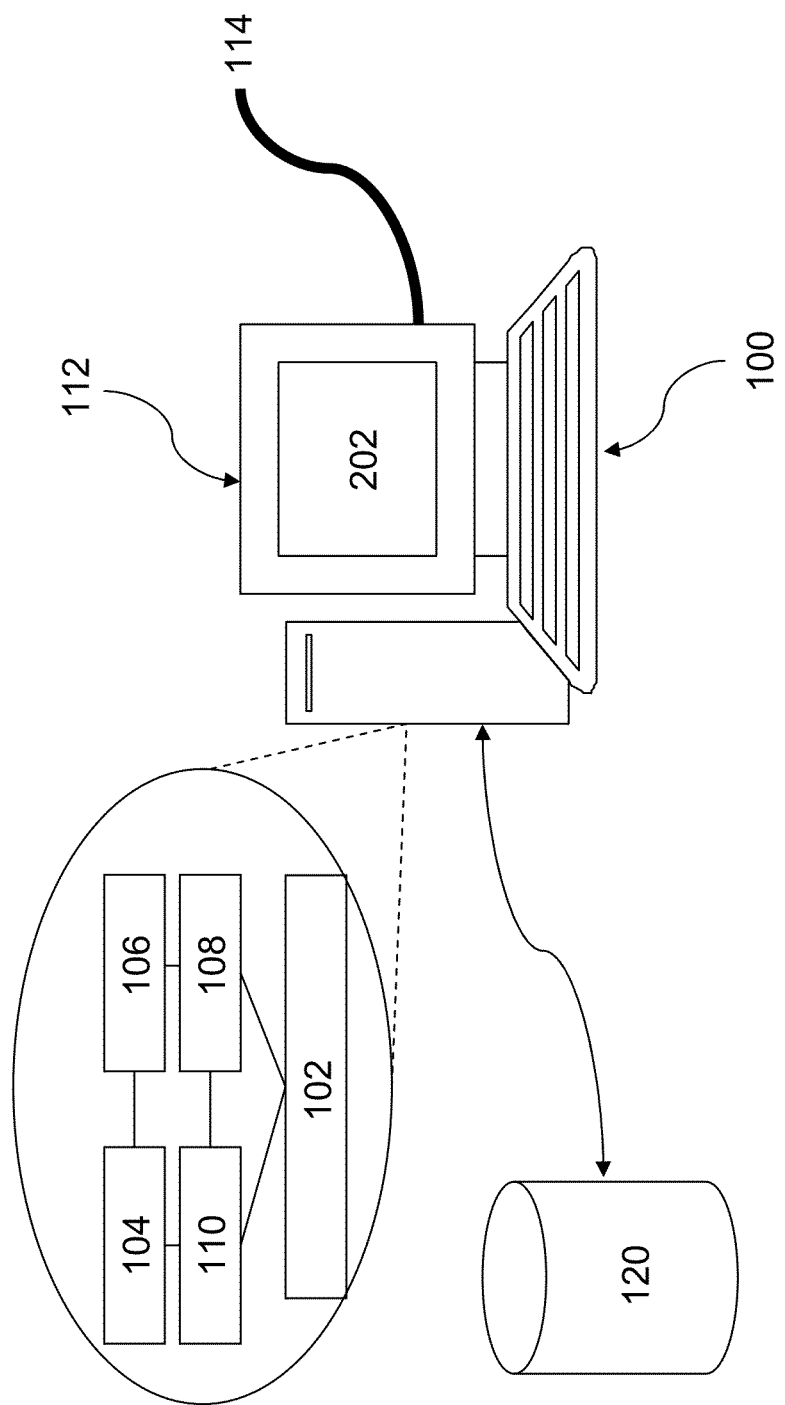
FIG. 1 is an example computing device utilizable to carry out a methodology in accordance with an embodiment of the invention.

Referring to FIG. 1, an embodiment of the present invention is illustrated. This embodiment is arranged to provide a system for preparing and collating data for future substantive analysis. At a broad level, the embodiment comprises an interface for receiving user instructions and displaying results, and a processor for executing user commands, including commands to collect data in a suitable manner for further processing. In this example embodiment, the interface and processor are implemented by a computer system having an appropriate user interface. The computer system may be implemented by any computing architecture, including stand-alone PC, client/server architecture, "dumb" terminal/mainframe architecture, or any other appropriate architecture. The computing system is appropriately programmed to implement the embodiment described herein.

In this embodiment, there is provided a local database containing patent data records. In another embodiment, it will be understood that the system may access a separately located and/or administered database containing patent data records. The database may be separately administered by a Government authority or third party.

Referring in detail to FIG. 1, there is shown a schematic diagram of a computing device which in this embodiment is a computing system 100. The system 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The system 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The system may include storage devices such as a disk drive 108 which may encompass solid state drives, hard disk drives, optical drives or magnetic tape drives. The system 100 may use a single disk drive or multiple disk drives. The system 100 may also have a suitable operating system 116 which resides on the disk drive or in the ROM of the system 100.

The system has a database 120 residing on a disk or other storage device which is arranged to store at least one record 122 providing patent related data. The database 120 is in communication with an interface (comprising one or more of the abovementioned components), which is implemented by computer software residing on the system 100. The interface provides a means by which the data may be appropriately searched and collated.

The interface is connected to the processor and is arranged to facilitate both the entering of user commands and the display of information to the user.

To perform an analysis of patent records held in the database, it is important to firstly ensure that the data records extracted from the database is reliable and "clean" (i.e. the data should ideally contain few or no errors and should be in a format that allows maximum information to be extracted from the records). It is commonly thought that patent records and patent databases are a clean and reliable source of information. However, even Government maintained databases are prone to human error and/or may not provide the facilities required to easily extract large amounts of data in a format suitable for substantive analysis.

Therefore, as a first step, it is necessary to correctly select appropriate patent records to be used in any subsequent analysis. The process is shown, generally at 200 in FIG. 2. At step 202, the user first defines a search query which is designed to extract relevant data records from a patent database. It will be understood that any suitable process may be used to arrive at the search query. At step 204, the search query is used to extract the set of data records. In more detail, at step 204a, a list of backward citations is identified within the list of attributes of each data record and at step 204b a list of forward citations is identified within the list of attributes of each data record.

It should be noted that in the context of the embodiments described herein, the term "forward citation" refers to a data record that contains, as an attribute value, a reference to another data record, while a "backward (or reverse) citation" refers to the data record that is referenced by another data record. It will be understood that in the context of embodiments described the terms "forward" and "backward" do not imply any chronological (or other) order.

At step 206, the backward and forward citations are compared to the list of data records originally extracted from the database and all identified citations that are not listed as data records in the current list of data records are extracted. These may be termed "additional data records". At step 208, information regarding the additional data records is extracted from the database. The extracted data records are concentrated to the original list of data records to create an amended list of data records.

This process may be iterated a number of times (210), until the user is satisfied (212). For example, the user may be satisfied with just one iteration, or be satisfied once a certain number of data records have been collected.

Figure 2:
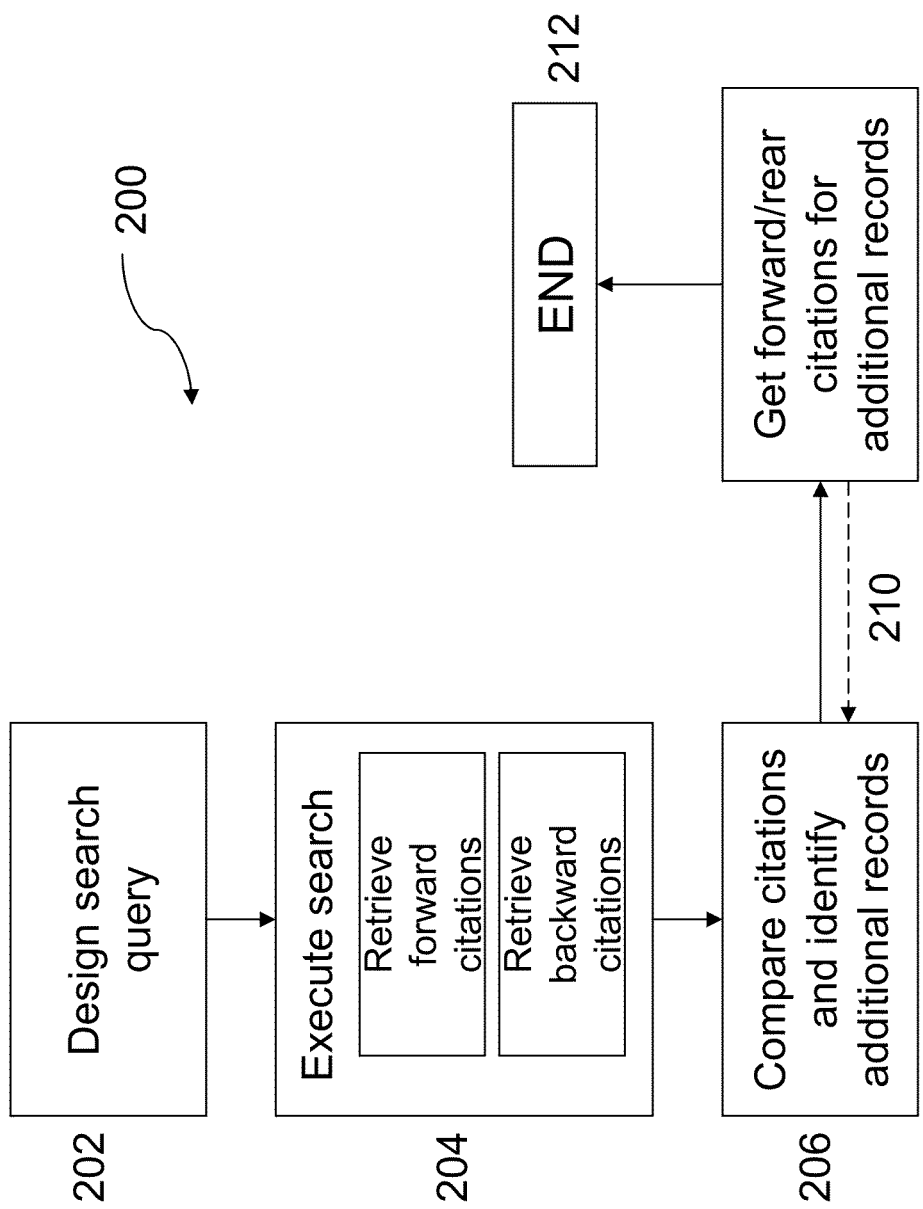
FIG. 2 is a process flow that describes an aspect of an embodiment of the invention.
Figure 3:
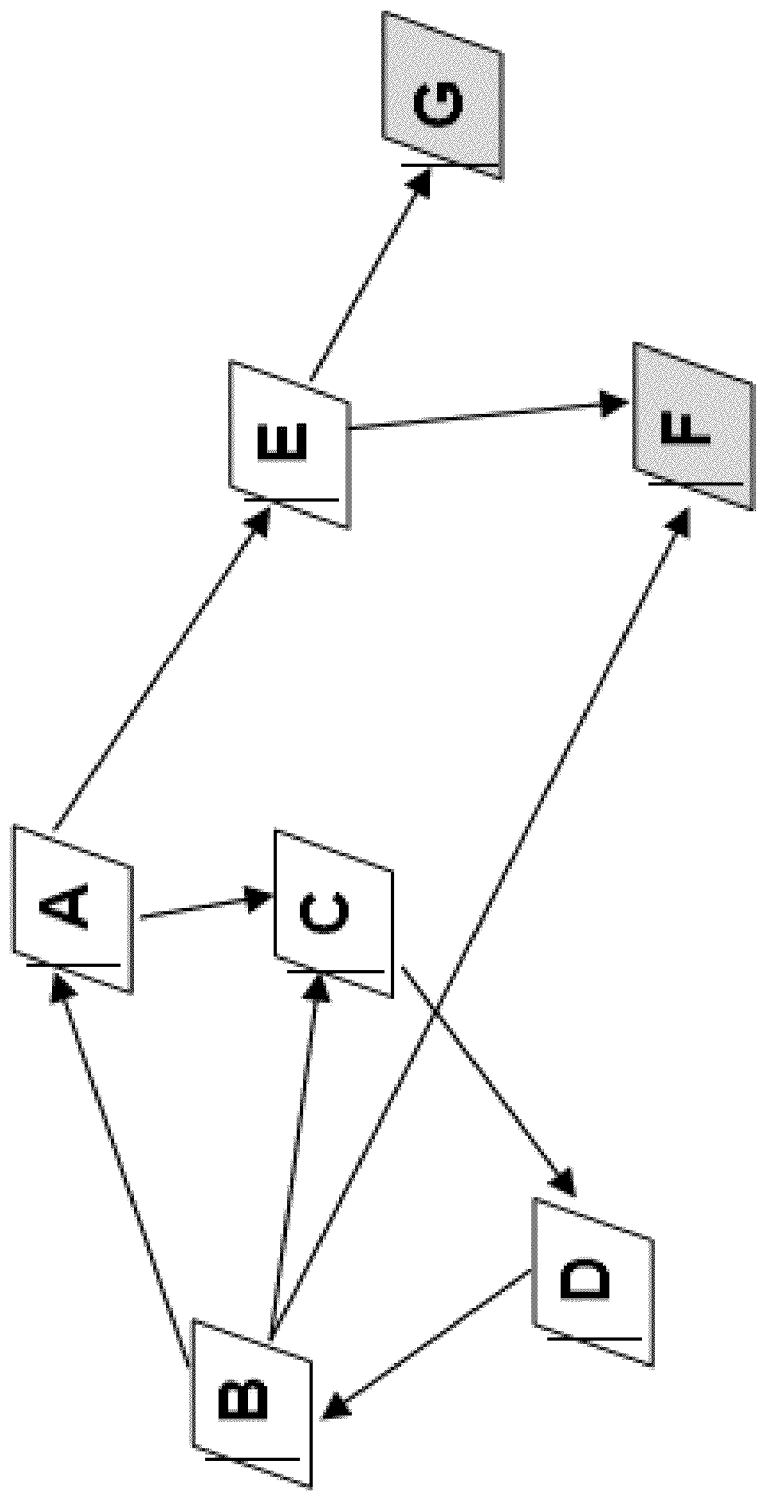
FIGS. 3 and 4 are network maps which describe a simplified example of an aspect of an embodiment of the invention.
Figure 4:
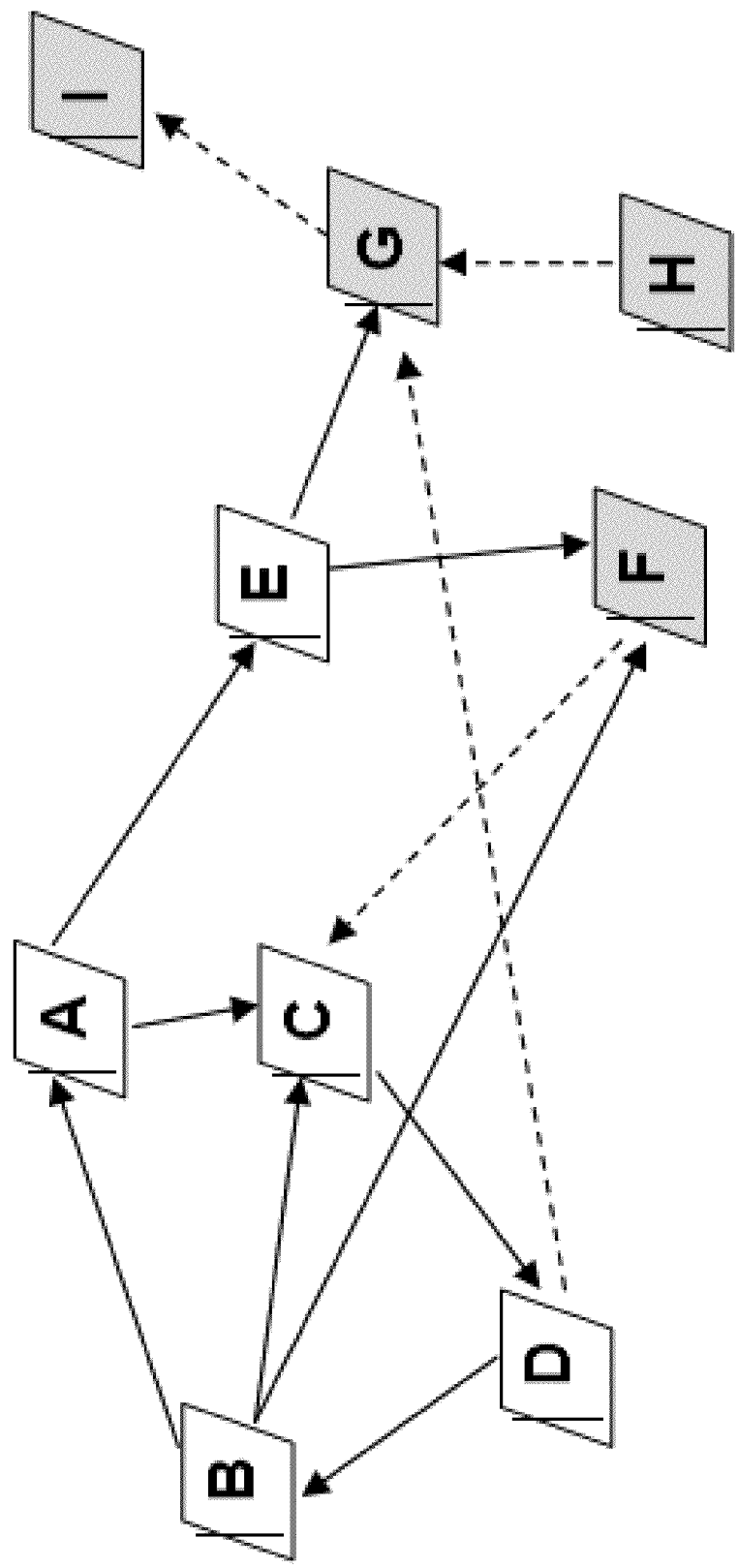

The process shown in FIG. 2 is best described by use of a simplified example shown in FIGS. 3 and 4 and with the aid of Tables 1 to 4.

Referring to FIG. 3, there is shown a diagrammatic representation of a set of data records which are also listed in Table 1.

TABLE 1

| Data Record | Backward Citations | Forward Citation |
|---|---|---|
| A | B | C, E |
| B | D | C, F |
| C | A, B | D |
| D | C | B |
| E | A | F, G |

As can be seen from Table 1, data records A through E have a number of backward and forward citations. As can be seen from FIG. 3 and Table 1, a number of the data records are "interlinked" by virtue of the fact that they either cite or are cited by at least one other data record. However, it will be noted that the citations for B and E refer to records F and G which are not listed in the search results of the original list of data records (i.e. referring to Column 1 of Table 1, the only records uncovered in the first search were data records A through E). The additional records (namely F and G) are then extracted from a database to produce Table 2 and subsequently, are combined with the original data set to form the table shown in Table 3.

TABLE 2

| Data Record | Backward Citations | Forward Citation |
|---|---|---|
| F | B | C |
| G | D, H | I |

TABLE 3

| Data Record | Backward Citations | Forward Citation |
|---|---|---|
| A | B | C, E |
| B | D | C, F |
| C | A, B | D |
| D | C | B |
| E | A | F, G |
| F | B | C |
| G | D, H | I |

Referring now to FIG. 4, there is shown a map of the data records listed in Table 3. It can be seen that data records H and I, while identified as a citation, do not appear in the original list of located data records (i.e. Column 1 in Table 3). As such, the process can be iterated again to determine the backward and forward citations of data records H and I as shown in Table 4. However, for the purposes of this simplified example, it is assumed that the user believes the results extracted provide a suitably comprehensive list of records which are adequate for any intended analysis and as such, no further searching is undertaken.

TABLE 4

| Data Record | Backward Citations | Forward Citation |
|---|---|---|
| A | B | C |
| B | D | C, F |
| C | A, B | D |
| D | C | B |
| E | A | F, G |
| F | B | C |
| G | D, H | I |
| H | (Not extracted from the data base or used in analysis). | (Not extracted from the data base or used in analysis). |
| I | (Not extracted from the data base or used in analysis). | (Not extracted from the data base or used in analysis). |

This methodology alone provides a powerful analysis tool since it allows the user to construct a map or a related list of documents that extends beyond the search results that would appear when utilising a conventional search methodology. In the embodiment described herein, this methodology finds two uses. Firstly, the methodology is utilisable as "one click" type process within the broader software application, where a user can choose to "expand the network" after performing an initial keyword search by merely clicking on the "expand network" button that is assembled through the user interface. More importantly, the methodology described above is a first step in a broader methodology that allows for sophisticated and substantive analysis and visualisation of patent data.

Once the methodology describe above has been carried out, the user may choose to perform some more detailed analysis on the patent records identified.

Once a set of data records including their citations have been downloaded, the data records may be linked to form one or more "networks" of data records.

In the context of the specification and the embodiments described herein, the term "network" is utilised to describe a conceptual entity where data records are associated to each other directly through a forward or backward citation or by a common attribute value (e.g. two patent data records which share a common citation are associated or "linked" by the fact that they share the same citation). Moreover, when referring to the visualisation of the association between records, the terms "network" and more specifically "network visualisation" are utilised to denote a spatial visualisation technique where data records may be presented in a visual, spatial format in either a two-dimensional or three-dimensional space by assigning a two-dimensional or three-dimensional closed shape to each data record (e.g. each data record may be denoted by a sphere) and utilising a one-dimensional connector (e.g. a line) to denote an association or link (i.e. a common attribute) between each node. In other words, it will be understood that the term "network" may refer to both the visual representation of a number of data records and also to the abstract construct the linkage between various data records by virtue of the association between data records that have a common attribute value. One methodology for building a visual "network" is described with reference to FIG. 5.

Figure 5:
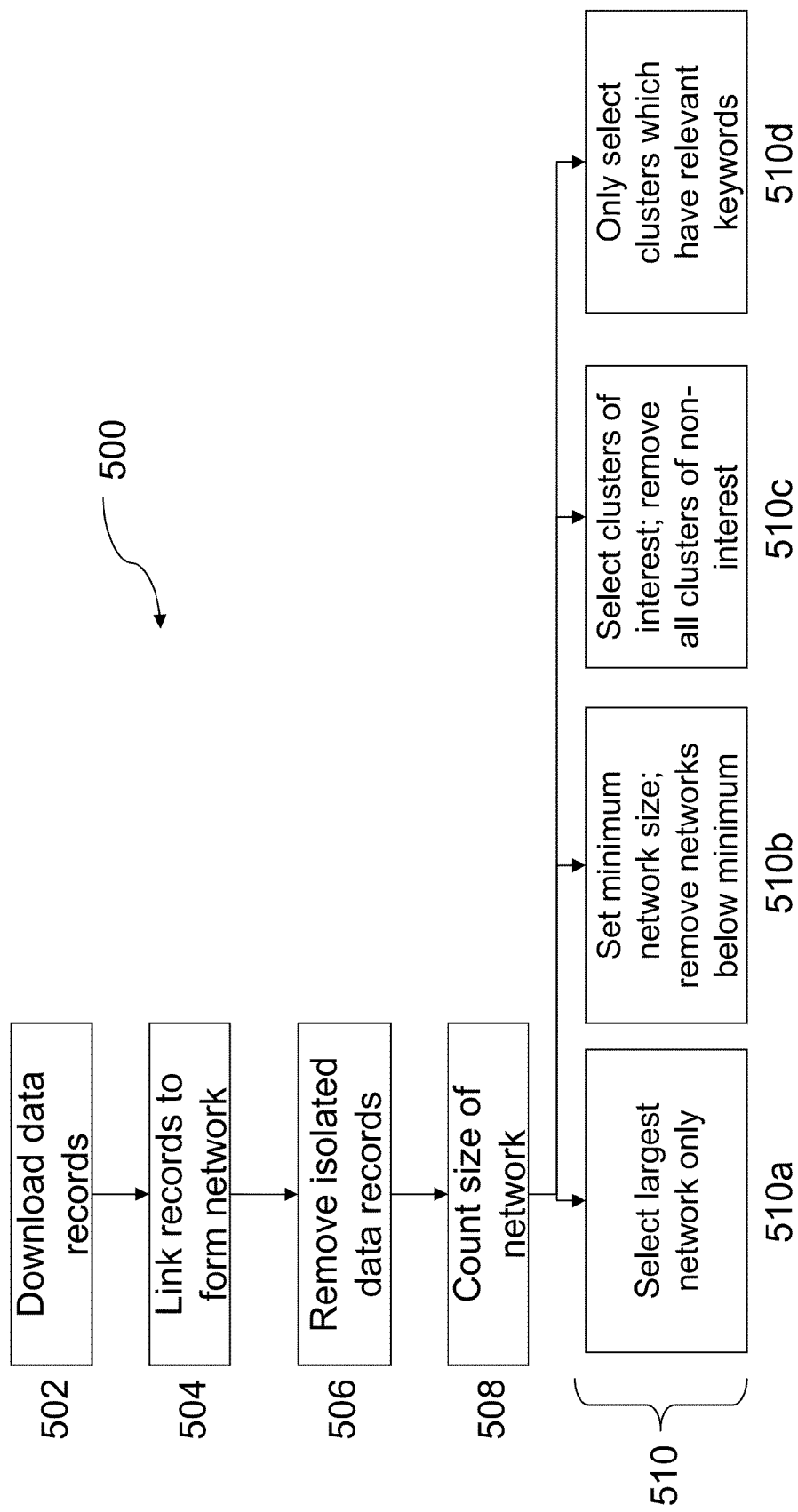
FIG. 5 is a process flow that describes another aspect of an embodiment of the invention.

In FIG. 5, there is shown a process flow 500, which includes a first step of downloading the data records 502 followed by a linking step 504 where data records are linked together to form one or more networks. The data records are linked using citation data.

At step 506, isolated data records are removed. That is, data records which are not linked to any other data record by known citation information are removed from the network. At step 508, as it is possible that a number of independent networks may have been formed, then, the size of each network is counted. If there are a number of networks then the methodology moves to step 510, to determine whether further analysis should be applied to each network. If there are multiple networks, then four possible methodologies may be utilised to further analyse each network, as denoted by steps 510a, 510b, 510c and 510d. At 510a, the largest network, only is selected (i.e. all other networks are ignored and no further analysis is applied). At 510b, one or more networks are selected by utilising a minimum size methodology. That is, only networks with a number of data records greater than a predetermined number are selected for further analysis. At step 510c, the user can identify and select a cluster from a number of clusters within a network, the cluster (rather than the network as a whole) having a number of data records greater than a predetermined number of records. At step 510d, the user may choose to select one or more networks based on the subject matter defined by the networks. As such, the user can choose to focus on particular subsections of the network map as a whole by only concentrating on networks that are of immediate interest or are of a suitable size.

Optionally, the user may then proceed to a step. If step 510*d* is selected that provides a number of methodologies for identifying the subject matter of each network (or cluster within a network). The user may be provided with a facility to individually view data related to each node in the network (e.g. the user may be able to view a list of attribute values for each of the data records within a network) so that the user can subjectively review the attributes of each data record and decide whether the subject matter is appropriate or of interest. Alternatively, an automated sorting method may be employed, which may include techniques such as ranking data records by the number of forward citations, the number of family methods or any other suitable method and then only displaying those records to the user to allow the user to subjectively review only those records.

Alternatively, another automated methodology is provided, namely that a classification attribute is used (for example an International Patent Classification Code) to identify the relevant subject matter of data records with a cluster or within a network.

Another variation, can use popular and technically related words to identify and classify data records.

It will also be understood that variations on steps a through d (including combinations of different methodologies) may also be utilised. Alternatively, various automated semantic text analysis methods may be utilised.

Returning to step 510, once the data has been collated correctly, the data may then be used as an input to further substantive analysis. Alternatively, the data may be modelled using appropriate visualisation software to create a network map.

The methodology described above is best explained through use of an example.

Figure 6:
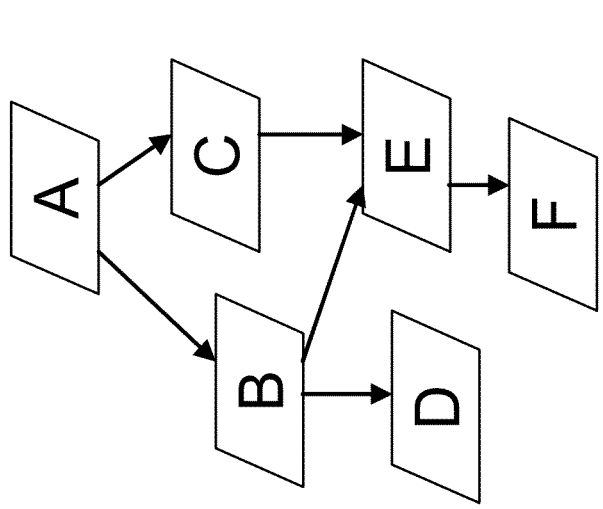

Referring to FIG. 6, there is shown a network map which lists the results of a search for children's authors in a database using a set of search criteria. The results in this simplified example identify eight (8) data records. Using citation relationships the eight (8) records form two non-connected data sets.

Figure 7:
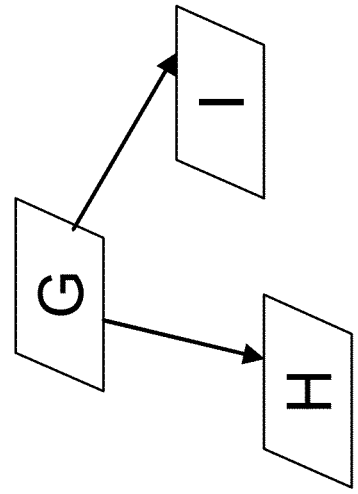
FIGS. 6 and 7 are network maps which describe a simplified example of another aspect of an embodiment of the invention.

A manual review of the subject matter shows that three of the data records in fact referred to authors who wrote for adults and not for children. As such, the data records that are not relevant can be removed from the data set to arrive at the network map shown in FIG. 7. Alternatively, in the example given the selection of the largest network would have also correctly identified the children's authors.

Once a network has been created, it will be understood that the visualisation (i.e. the display of the network to an end user) will not always convey useful information, due to the fact that the network may contain thousands, tens of thousands or potentially hundreds of thousands of nodes, such that larger clusters of nodes may partially or wholly obscure other clusters of nodes. As such, there is a need to provide a methodology for reducing the number of data records in a network to make the structure easier to visualise and interpret. For the purposes of better describing this embodiment, it is instructive to provide some definitions.

In the context of the foregoing embodiment, a "Direct Link" is a direct citation link between two data records.

An "Indirect Connection" is any link between data records $D_A$ and $D_B$ which is not a direct link (i.e. $D_A$ links to $D_B$ through one or more intermediate data records $D_C$, $D_D$ etc);

a "Path Link" refers to the number of data records found in the shortest path between any two data records;

an "Intermediate Data Record" refers to any data record that lies in the shortest path between any two outer records that are not directly connected;

a "Two Degrees of Separation Link" refers to any indirect connection between any two data records $D_A$ and $D_B$ that has a path link of 2 (i.e. there is only one data record $D_C$ between $D_A$ and $D_B$); and an "N Degree of Separation Link" refers to any indirection connection between any two data records that has a path link of N.

Figure 8:
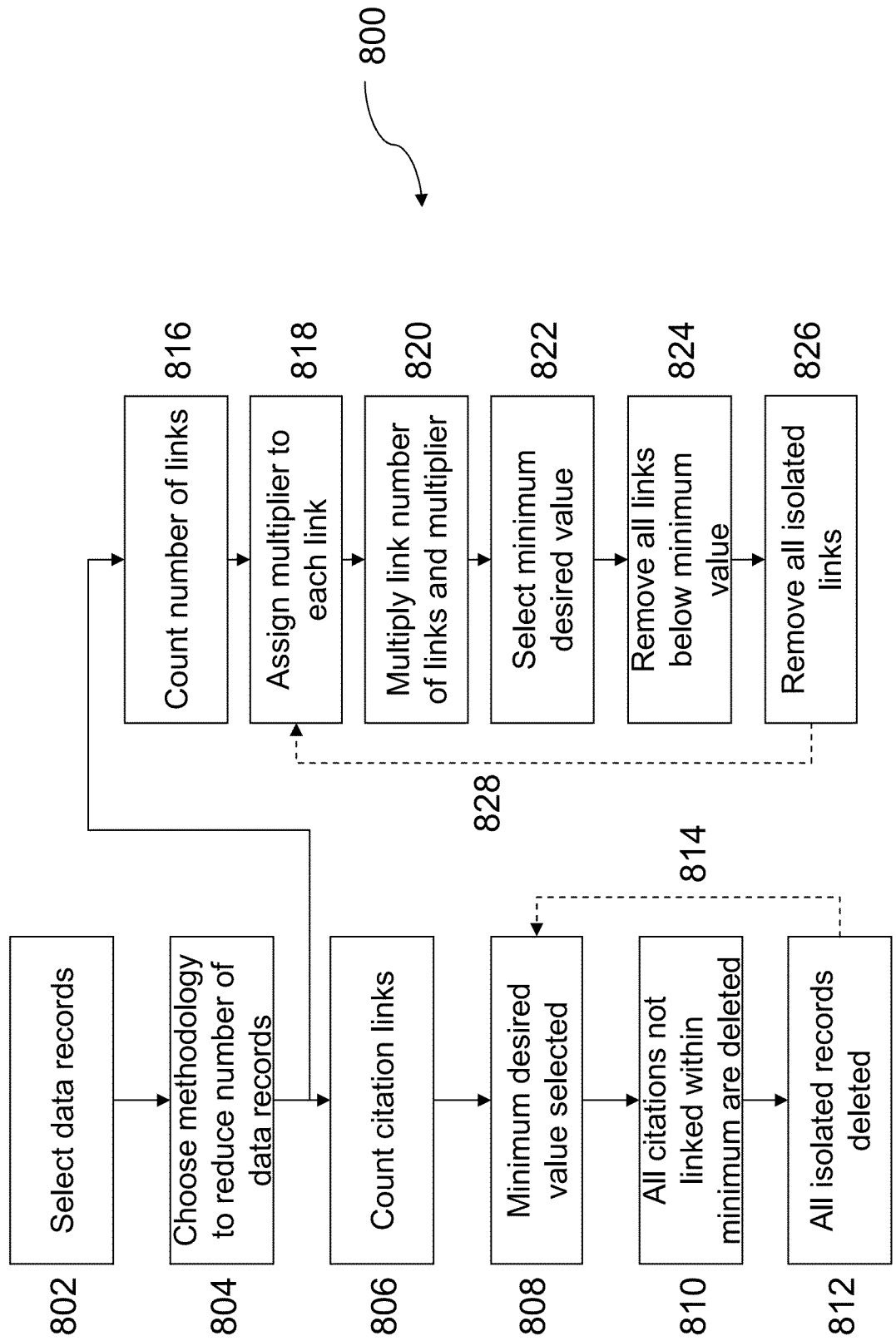
FIG. 8 is a process flow that describes yet another aspect of an embodiment of the invention.

With these definitions in mind, there is now described an embodiment which allows for the automatic selection and culling of data records to be used in a network visualisation or any other data analysis. The embodiment is described with reference to flowchart 800 in FIG. 8. At 802, a set of data records is selected, such that all data records are linked to each other either directly or indirectly. At steps 806 to 810, there are shown two possible methods for reducing the number of data records within the particular network. At 804A, there is shown the two degree separation link count methodology. At step 806, for each direct citation link between every connected pair of data records $D_A$ and $D_B$ (where $D_A$ and $D_B$ are also two degree of separation links), the number of data records $D_I$ that directly link to both $D_A$ and $D_B$ are counted to provide a value for a citation link (C2). At 808, a minimum value of C2 is selected (i.e. $C2_{MIN}$). All direct links where the C2 value is less than the $C2_{MIN}$ are removed at step 810. At step 810 all data records that are not connected to the network after the direct links are removed in step 3 are also removed. At step 814 (which is optional), different values of $C2_{MIN}$ are utilised to determine the effect of each different value on the final structure of the network.

Figure 9:
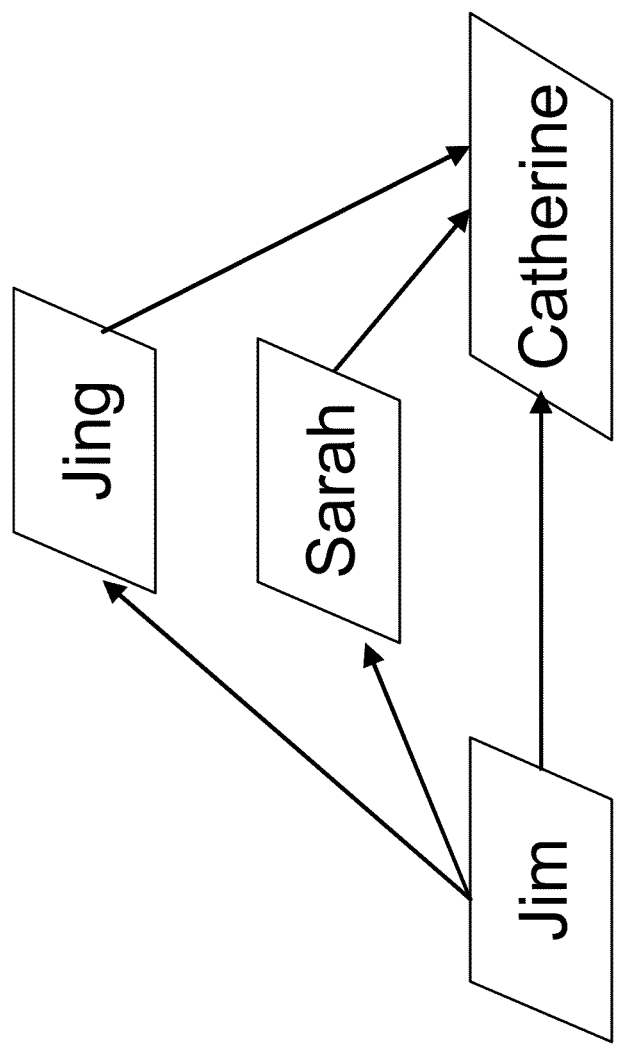
FIGS. 9, 10, 11, and 12 are network maps which describe a simplified example of yet another aspect of an embodiment of the invention.
Figure 10:
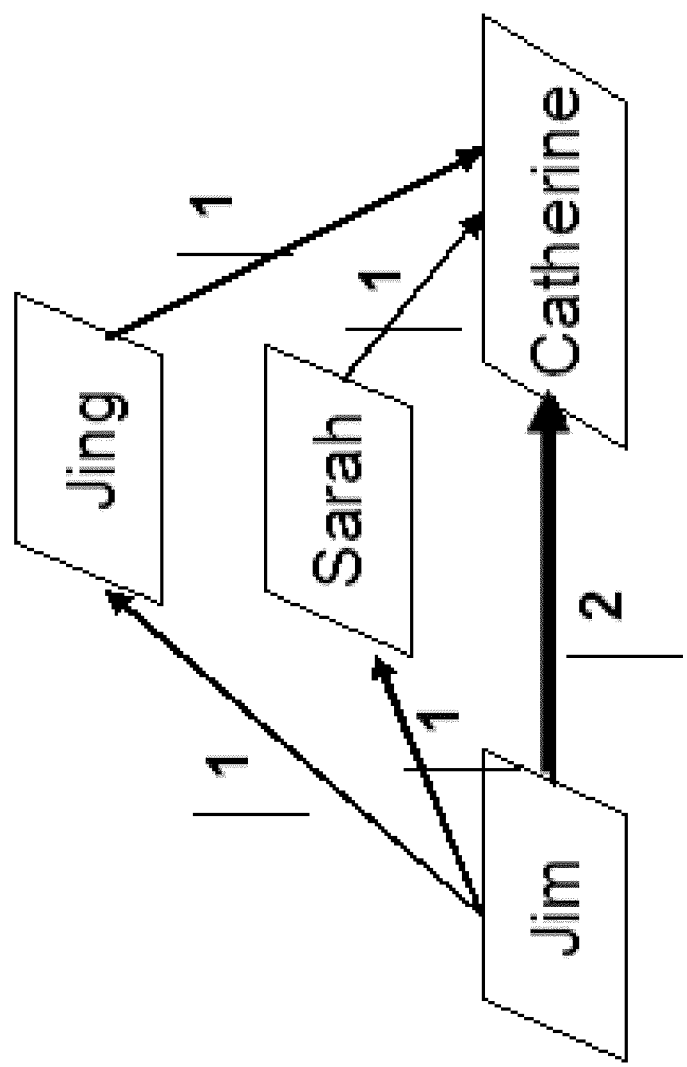
Figure 11:
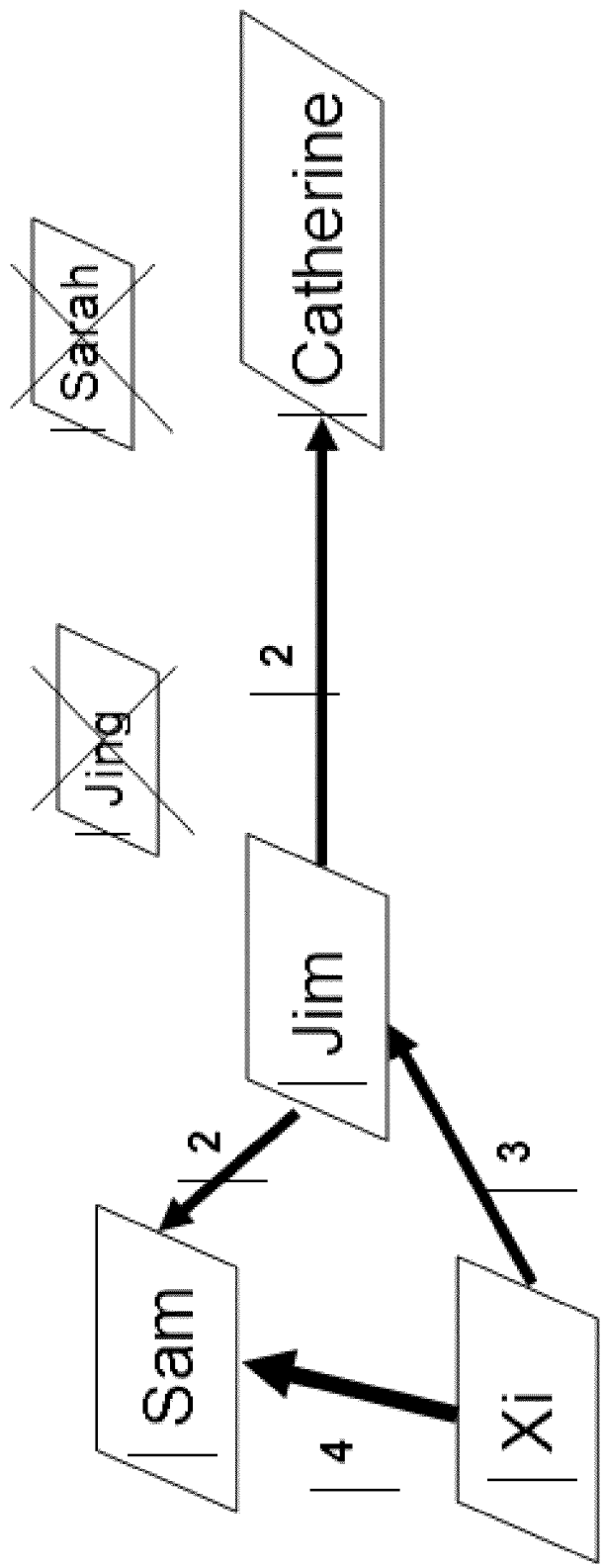

The methodology is explained further with reference to an example and FIGS. 9, 10 and 11. A set of data records which are linked to the connections between people within an organisation. In the example, Jim shares knowledge with Catherine directly but Jim also mentors to other people who also mentor Catherine. Therefore, as shown in FIG. 10 each link has a value of 1. However, if we wish to identify the strongest relationship in the organisation, we firstly calculate the C2 value for each pair which is displayed in FIG. 10. As can be seen in FIG. 10, the mentoring relationship between Jim and Catherine is assigned a C2 value of 2, which represents two 'Two Degrees of Separation' Links. However, there are other mentoring relationships, and an attempt to focus on the strongest relationship, the organisation assigns a $C2_{MIN}$ value of 2. Therefore, since the mentoring relationships between Jim and Jing, Jim and Sarah, Jing and Catherine, and Sarah and Catherine each only have a C2 value of 1 in this present diagram, before all relationships are removed as shown in FIG. 9A. If we expand this across an entire organisation (i.e. include members of the organisation not shown in FIGS. 9 and 10), we arrive at the final chart of FIG. 11. At the end of the process, only direct links with a C2 value greater than 2 and only data records that remain linked to a network are retained. That is, Jing, Sarah and others are removed from the initial network and only four people remain in FIG. 9. As such, the principal or main mentors and their relationship to the other main mentors are shown and it can be seen that Xi is the "main" or central mentor followed by Jing.

Alternatively, a different methodology may be utilised to determine nodes of high importance. A second embodiment uses an 'Mcount' method. At step 816, for every link between every pair of data records in a network $D_A$ and $D_B$, whether directly connected or otherwise, the number of data records $D_I$ are counted in all paths between $D_A$ and $D_B$, where the degree of separation for these paths is one degree, two degrees, N degrees etc. There is a sign of value to the count C2, C3, CN respectively. At 818, a multiplier is assigned to each direct link—each one degree link each 2 degree link, etc, namely N1, N2, . . . NN. At step 820, for each direct citation link, the C2 value is multiplied by N2, the C3 value by N3 and so on; and finally the multiples are added together along with the N1 value to provide a Mcount for each citation link. At step 822, a minimum value of Mcount is selected. At step 824, all direct citation links where the Mcount value is less than $Mcount_{MIN}$ are removed. At step 826, all data records that are not connected to the network after the links are removed are also removed. Optionally, it may be possible to experiment with different values N1 and N2 (see step 828) to determine the affect of these different values on the final structure of the network.

Figure 12:
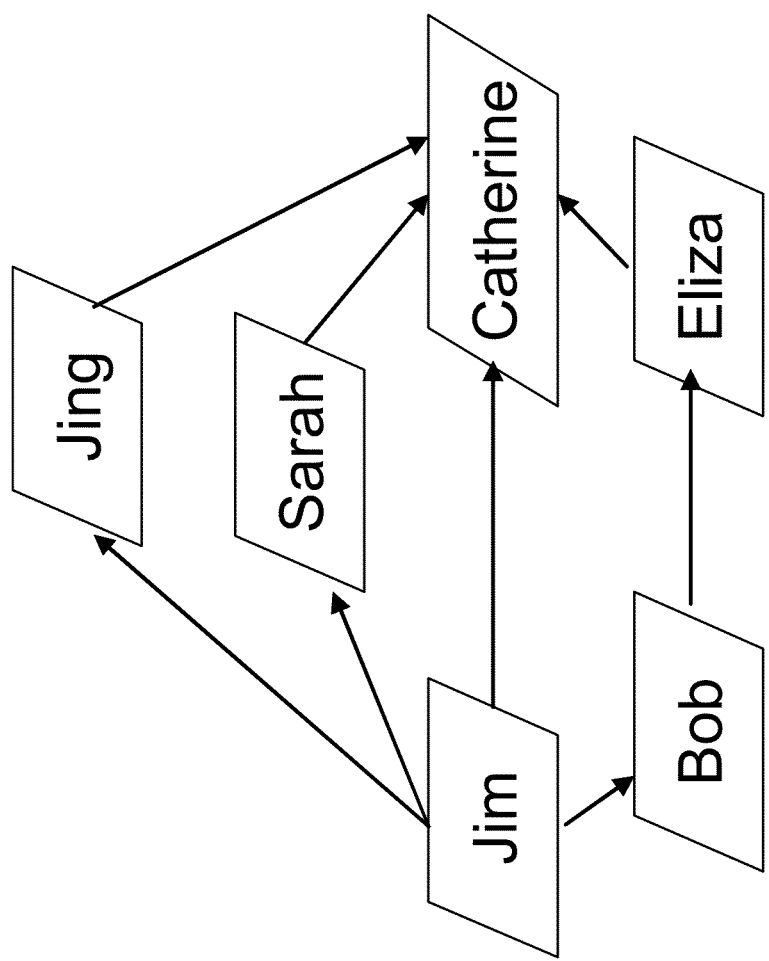

With reference to FIG. 12 and Tables 5, 6 and 7, it can be seen that if we take a similar example to the last example (i.e. mentoring in a workplace), FIG. 11 shows that between Jim and Catherine there is one degree of separation, but each of Jim and Catherine also have relationships of two degrees of separation and one three degrees of separation relationship. Hence the relationship between Jim and Catherine has the Mcount values found in Table 5.

The multiplier for each of the Mcount values is decided (as per Table 6).

TABLE 5

| Count Contributor | Value |
|---|---|
| C1 | 1 |
| C2 | 2 |
| C3 | 1 |

TABLE 6

| Multiplier | Value |
|---|---|
| N1 | 1 |
| N2 | 0.5 (½) |
| N3 | 0.33 (⅓) |

Therefore, the final Mcount values are shown in Table 7.

TABLE 7

| Degree of Separation | M Count Contributor |
|---|---|
| 1 | 1*1 = 1 |
| 2 | 2*0.5 = 1 |
| 3 | 1*0.33 = 0.33 |
| Final MCount Value | 2.33 |

In the example, if the minimum Mcount value ($Mcount_{MIN}$) is set as being 2, then the only relationship that has a higher value than $Mcount_{MIN}$ is the relationship between Jim and Catherine at an N count value of 2.33, so this relationship is retained but all other relationships are culled.

Utilising this methodology, it becomes much easier to focus on data records of high importance, and remove data records that, may be only peripheral to a particular subject area.

Although not required, the embodiments described with reference to the Figures can be implemented as an Application Programming Interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A computer-implemented method of automated preparation of a set of data for analysis, the method comprising the steps of:
   (a) retrieving from non-volatile memory or via a communication network an input data set including a plurality of records, each of the plurality of records including an identifier attribute value and at least one associative attribute value, the identifier attribute value being an identifier for the record and each associative attribute value being an identifier of another record;
   (b) identifying one or more further records to retrieve by comparing each associative attribute value from each of the plurality of data records in the input data set with the identifier attribute values of each of the plurality of records in the input data set, to determine any associative attribute values not matching any one of the identifier attributes values of records in the input data set, the associative attribute values not matching any one of the identifier attributes being identifier attributes of the one or more further records to retrieve;
   (c) retrieving from non-volatile memory or via a communication network the identified further records to retrieve;
   (d) associating the retrieved one or more further records with the initial data set to form a final data set;
   (e) forming one or more networks from records of the final data set by:
   (f) determining a plurality of direct connections, each one direct connection linking one record of the plurality of data records of the final data set that share at least one common identifier attribute value, to form one or more networks of data records to another one record of the final data set as a pair of data records, where the identifier attribute value of one record of the pair is the same as an associative attribute value of the other record of the pair; and
   (g) determining a set of records for each of the one or more networks based on the direct connections, where each record of the network forms a pair via a direct connection with at least one other record in the network; and (h) for at least one network, reducing the number of data records in the set of records for the network by performing the steps of:

(i) identifying at least one pair of data records in the network having a direct connection and, for each selected pair of data records:

(j) identify any one or more indirect connections linking the pair of data records via one or more intermediate records, each indirect connection consisting of x direct connections forming an x degree of separation link between the pair of data records, where x is a variable number between 2 and a maximum value n, and the value of x may be different for each indirect connection;

(k) counting the number of indirect connections identified for each pair of records to derive a total count for the links between the data records of the pair;

(l) setting a threshold level for the total count value between each pair of data records;

(m) removing a direct link of any pair of data records having a total count value below the set threshold level; and (n) removing all data records that then no longer have a direct connection to any other record in the network; and (o) processing at least one of the one or more networks for further analysis or display.

2. A computer-implemented method of preparing data for analysis as claimed in claim 1, wherein deriving a total count value for the links between the data records of a pair further includes the steps of:

counting the number of instances of indirect links for each degree of separation value x to derive a separation value for each of the degrees of separation for the pair of data records;

multiplying each respective separation value with a multiplier assigned for the degree of separation to derive a count value for each degree of separation; and summing the count value for each degree of separation to derive a total count value.

3. A method in accordance with claim 1, wherein the maximum value of n equals 2.

4. A method in accordance with claim 1, wherein the threshold level for the total count value between each pair of data records is set based on a user selection.

5. A system for the automated preparation of a set of data for analysis comprising:

a display;
a processor; and
a storage device;
the processor comprises:
a retrieving module;
an association module;
a linking module; and
a reduction module,
the retrieving module being arranged to retrieve, from non-volatile memory or via a communication network, and store on the storage device an input data set including a plurality of records, each of the plurality of records including an identifier attribute value and at least one associative attribute value, the identifier attribute value being an identifier for the record and each associative attribute value being an identifier of another record;

the association module being arranged to, in response to the plurality of records being retrieved and stored, identify one or more further records to retrieve by comparing each associative attribute value from each of the plurality of data records in the input data set with the identifier attribute value of each of the plurality of records in the input data set, to determine any associative attribute values not matching any one of the identifier attributes values of records in the input data set, the associative attribute values not matching any one of the identifier attributes being identifier attributes of the one or more further records to retrieve;

the retrieval module being further arranged to retrieve from non-volatile memory or via a communication network and store in the storage device the identified further records to retrieve;

the association module being further arranged to associate the retrieved one or more further records with the initial data set to form a final data set;

the linking module being arranged to, in response to the final data set being formed, form one or more networks from records of the final data set by:

determining a plurality of direct connections, each one direct connection linking one record of the plurality of data records of the final data set to another one record of the final data set as a pair of data records, where the identifier attribute value of one record of the pair is the same as an associative attribute value of the other record of the pair; and determining a set of records for each of the one or more networks based on the direct connections, where each record of the network forms a pair via a direct connection with at least one other record in the network;

the reduction module being arranged to, in response to the one or more networks being formed, for at least one network reduce the number of data records in the set of record for the network by;

identify at least one pair of data records in the network having a direct connection and, for each selected pair of data records:

identify any one or more indirect connections linking the pair of data records via one or more intermediate records, each indirect connection consisting of x direct connections forming an x degree of separation link between the pair of data records, where x is a variable number between 2 and a maximum value n, and the value of x may be different for each indirect connection;

count the number of indirect connections identified for each pair of records for the links between the data records of the pair;

set a threshold level for the total count value between each pair of data records;

remove a direct link of any pair of data records having a total count value below the threshold level; and remove all data records that then no longer have a direct connection to any other record in the network; and a visualisation module arranged to control display on the display of at least one of the one or more selected networks of data records utilising a visualisation methodology.

6. A system in accordance with claim 5, wherein the maximum value of n equals 2.

* * * * *